United States Patent [19]

Berner

[11] 4,423,486
[45] Dec. 27, 1983

[54] COMMODITY DISPLAY FOR WEIGHING SCALE

[75] Inventor: George J. Berner, Xenia, Ohio

[73] Assignee: Hobart Corporation, Troy, Ohio

[21] Appl. No.: 258,965

[22] Filed: Apr. 30, 1981

[51] Int. Cl.³ ............................................. G06K 15/02
[52] U.S. Cl. ..................................... 364/466; 177/25; 235/383
[58] Field of Search ......................... 364/466, 200, 900; 177/2, 4, 25; 53/502; 235/61.9 R, 383

[56] References Cited

U.S. PATENT DOCUMENTS

| | | | |
|---|---|---|---|
| 3,688,276 | 8/1972 | Quinn | 364/200 |
| 3,974,496 | 8/1976 | Aptroot-Soloway | 364/518 |
| 3,989,929 | 11/1976 | Treibler | |
| 4,109,857 | 8/1978 | Teroka et al. | 177/25 X |
| 4,229,794 | 10/1980 | Foster | 364/466 |
| 4,363,693 | 12/1982 | Fujii et al. | 364/466 X |
| 4,365,148 | 12/1982 | Whitney | 177/4 X |

OTHER PUBLICATIONS

Setting the Pace for the "80s", brochure by Hobart Corporation, distributed in May, 1981.
Sanitary Scale Company document entitled "TR3 (UPC) Integrated Prepack Systems", distributed in May, 1981.
Supermarket Business–Scanning 1981, Feb., 1981.
Supermarket Business–Up–Date Scanning 1981.

Primary Examiner—Edward J. Wise
Attorney, Agent, or Firm—Biebel, French & Nauman

[57] ABSTRACT

A combined weighing scale and label printer for weighing a packaged commodity (15) includes a scale (10), a keyboard (60), a display (70), a controller (40) and a label printer (30). Memory means (170) within the controller contains a commodity name and other relevant product information. The operator may interrogate the memory means by a keyboard entry at any time to obtain a human-readable verification of the commodity name prior to printing a label (80). Since the commodity name may be longer than the individual elements which comprise the display means, the commodity may be displayed in a rotating or running fashion from right to left.

9 Claims, 23 Drawing Figures

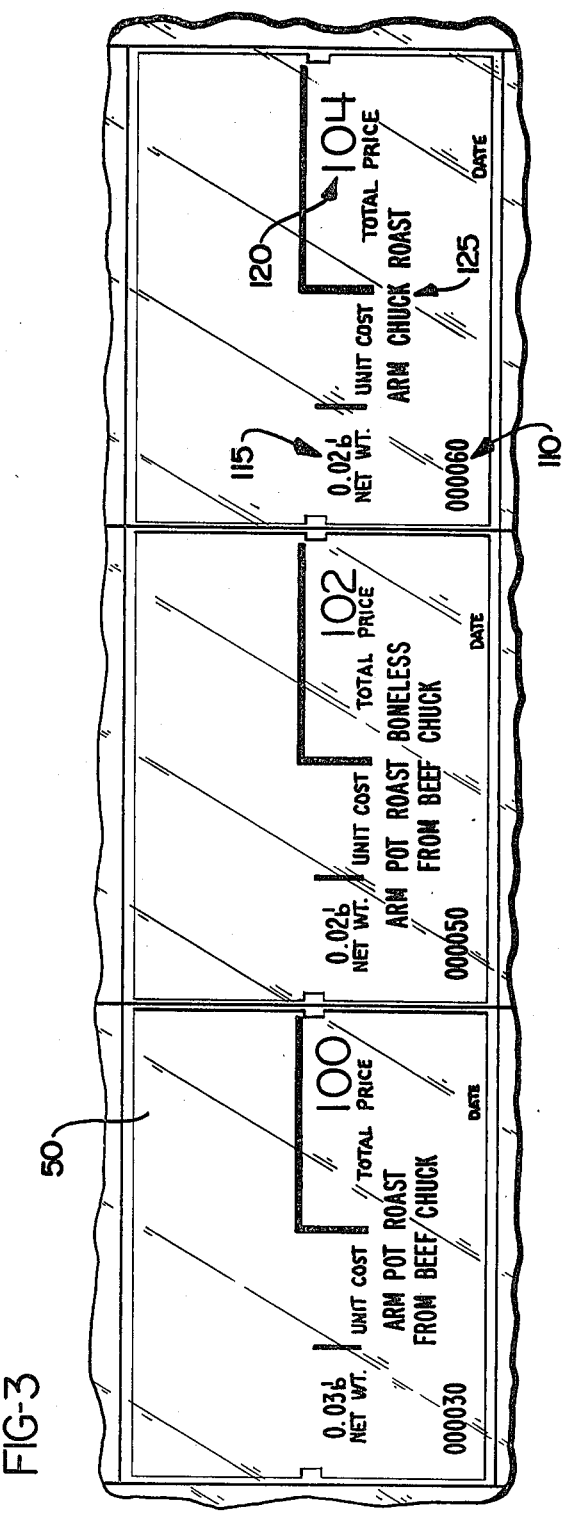
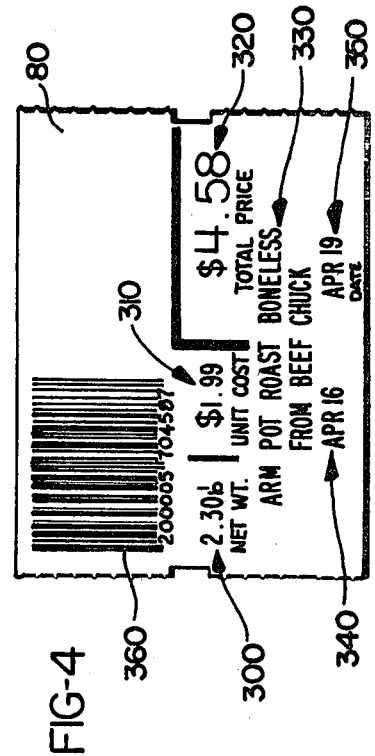
FIG-3
FIG-4

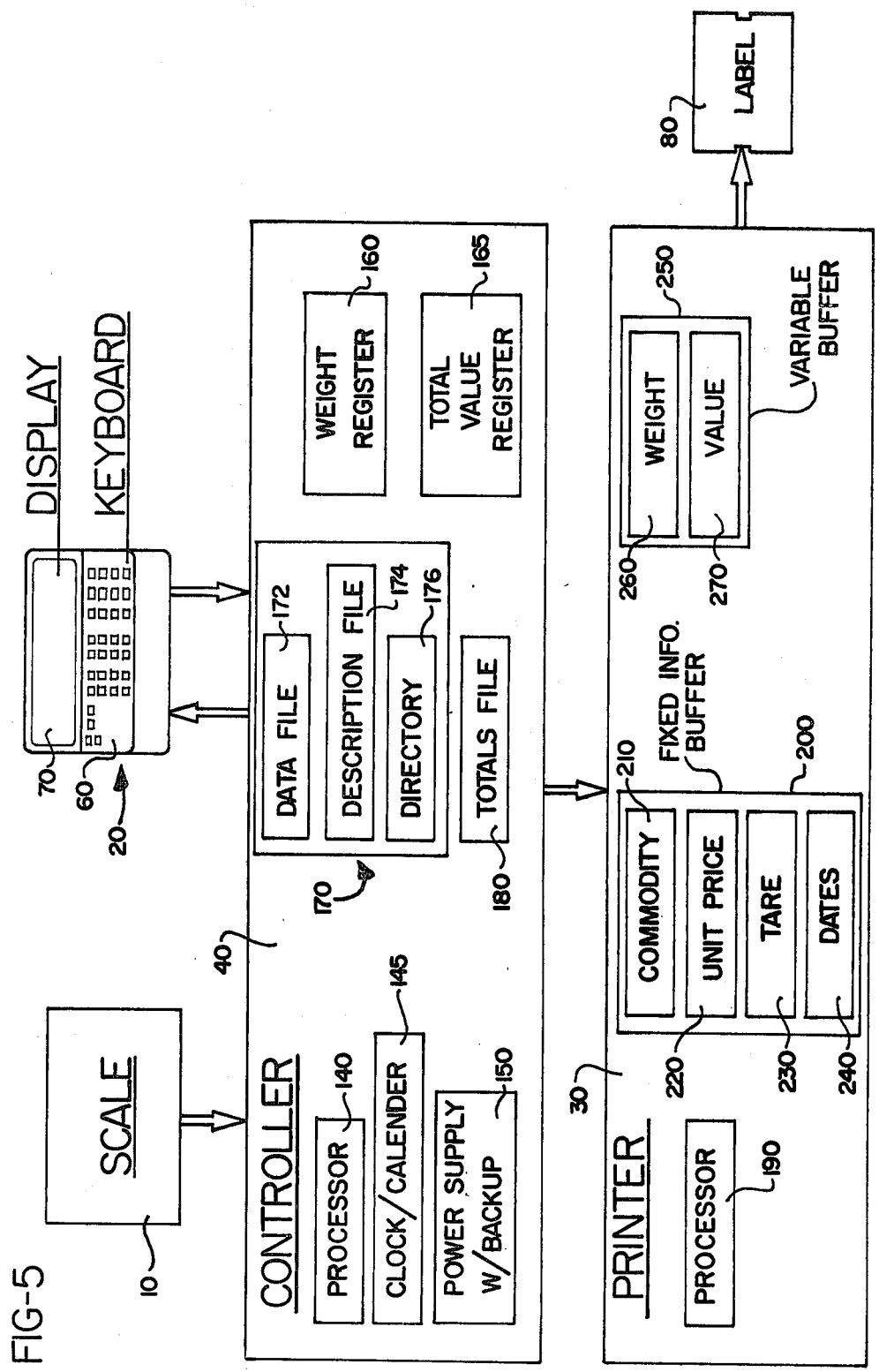

COMMODITY DISPLAY FOR WEIGHING SCALE

BACKGROUND OF THE INVENTION

Computing weighing scales combined with printers which print labels that are to be applied to packages of food have been known for some time. Typically, such systems print the net weight, unit price and computed total value of the product. Frequently, in addition to that information, there is also printed in human-readable form the name of the product or commodity.

Commodity name printing has usually been done in one of two ways. The most common way of printing the commodity name on the label has been to provide a series of insertable commodity "keys," one for each product which is normally handled in the particular environment in which the scale system is used. For example, in the meat department of a supermarket, there may be 100 or more different cuts of beef, each with its own name, and somewhat smaller numbers of commodity keys for pork and ham, veal, lamb and poultry. Each key would be provided with raised reverse-reading printing type and the label would be impressed against the inked type (or vice versa) for printing.

Another more recent development in such weighing-/label printing systems has been the entry of a numerical or other commodity code on a keyboard by the operator. Each different commodity has its own code number and the introduction of that code number into the system would, through computer translation, cause the commodity name to be printed in human-readable form on the label by setting type wheels in the proper position for printing the label to produce the commodity name.

In still another development, an alphabetical (rather than numerical) keyboard is provided, the operator using such equipment by merely punching the appropriate lettered keys of the selected commodity name. In such latter system, there is no need to translate between code numbers and desired commodity name to assure that the proper commodity name will be printed on the label. This latter system can be cumbersome in instanced where numerous commodity changes are made by requiring a new name to be keyed in each time. Some such names may have several dozen letters.

Until now, those systems which set printer type according to a numerical code entry onto a keyboard by the operator have required the actual printing of a first label to verify that the proper code was selected for the packaged commodity. Normally, this also required weighing the first package in order to produce the necessary computation of total value from the weight and unit price. Typically, a chart of commodity names and associated codes would be provided close at hand for the operator to scan before selecting the code to be entered. In practice, however, as operators get more experienced, they frequently tend to rely on their memories to associate code numbers with specific products, rather than look them up on the chart each time. In either case, a wrong keyboard entry not only causes loss of the first label, but also requires the operator to make an immediate keyboard correction and a repeat weighing.

Many weighing/label printing systems of this type introduce the printed label with the printed side facing downwardly and the mucilage side facing upwardly. Thus, to verify that the commodity code entered corresponds to the commodity being packaged and weighed, the operator first weighs a package, automatically prints a label, and removes the downwardly facing label from the printer for verification of the commodity name. One example of a printer of this type is shown in U.S. Pat. No. 3,989,929. This can be done by touching the mucilage side of the label to lift it, make a quick visual verification, apply it to the package if correct, or destroy it and enter a new commodity code if incorrect. Another way that verification is made by some operators is to press the package directly against the upwardly facing mucilage to remove the label and at the same time affix it to the package. If, however, the commodity name is incorrect, a new entry must be made, a new label printed by repeating a weighing of that package, and the new label applied over the first incorrect label to effectively void the first label by covering it.

In other systems where labels are mechanically transported from the printer and applied automatically by machinery (as shown in FIG. 7 of U.S. Pat. No. 3,989,929), the initial package which is automatically weighed and conveyed to a label applying station is delivered downstream from the labeling station so that it may be visually verified as to the correctness of the commodity in the package. To avoid excessive rework, a single package should be fed through the machine, labelled and verified before continuing with production. If incorrect, additional problems are encountered in re-entering the correct commodity code and sending the package through the automated machinery for a second weighing and labeling application.

A further problem which may be encountered when there is a change of operators, or when one operator returns from lunch or some other situation in which there has been a time lapse since last machine operation, is that it is often necessary to check what commodity name was last entered into the system. This is true whether the keyboard entry is accomplished by either a number code or letters of the alphabet, i.e., prior art systems required an actual or simulated weighing, coupled with a label printing for commodity name verification.

SUMMARY OF THE INVENTION

The present invention avoids the inconveniences and additional work associated with incorrect entry of numerical or other commodity codes in a system of the type described by providing an immediate, visual, human-readable display to verify the code entry for a given commodity name prior to the printing of a first label. The invention further eliminates correction of errors in that type of automatic computing weighing system where totals for all weighed packages of a given commodity are entered into a central computer for inventory purposes. The invention minimizes waste of labels and improves operator productivity by assuring an operator that the system is properly set up prior to the weighing of a first package or printing of a sample label.

The above advantages are accomplished in a most convenient and cost effective manner by utilizing individual display elements (such as are normally used for displaying weight, unit price and total value) in an elongated, associated manner. Those same elements are then used to display the commodity name and, in the preferred embodiment, to provide that same commodity display in rotating or running fashion from right to left. This enables long commodity names to be displayed with a minimum number of elements while also using those same elements for other purposes.

It is, therefore, an object of this invention to provide a combined weighing scale and label printer for weighing a packaged commodity, printing an adhesive label with information regarding the weight, unit price and total value of the commodity and delivering the printed label printed side down for application to the package including a keyboard for entering a code corresponding to the name of the packaged commodity; visual display means responsive to a keyboard entry for displaying a human-readable verification of the commodity name prior to printing a first label for said commodity; and means for computing the total value of the packaged and weighed commodity, and in response thereto, printing such total value along with the weight, unit price and commodity name on a label for application to said package.

It is a further object to provide a combined weighing scale and label printer as described above wherein said visual display means comprises a series of individual alphanumeric display elements associated in elongated horizontal arrangement, wherein selected information relating to the weight, unit price or total value are displayed on selected ones of said elements during a weighing operation, and wherein said same elements are also utilized to display the human-readable commodity information when called for by the operator.

Other objects and advantages of the invention will be apparent from the following description, the accompanying drawings and the appended claims.

BRIEF DESCRIPTION OF THE DRAWINGS

FIG. 3 is a view showing a portion of the catalog of labels, each label showing some of the information contained in the system memory for each commodity.

FIG. 4 represents a printed label.

FIG. 5 is a simplified block diagram of the weighing and label printing system of this invention.

DESCRIPTION OF THE PREFERRED EMBODIMENT

Figure 1:
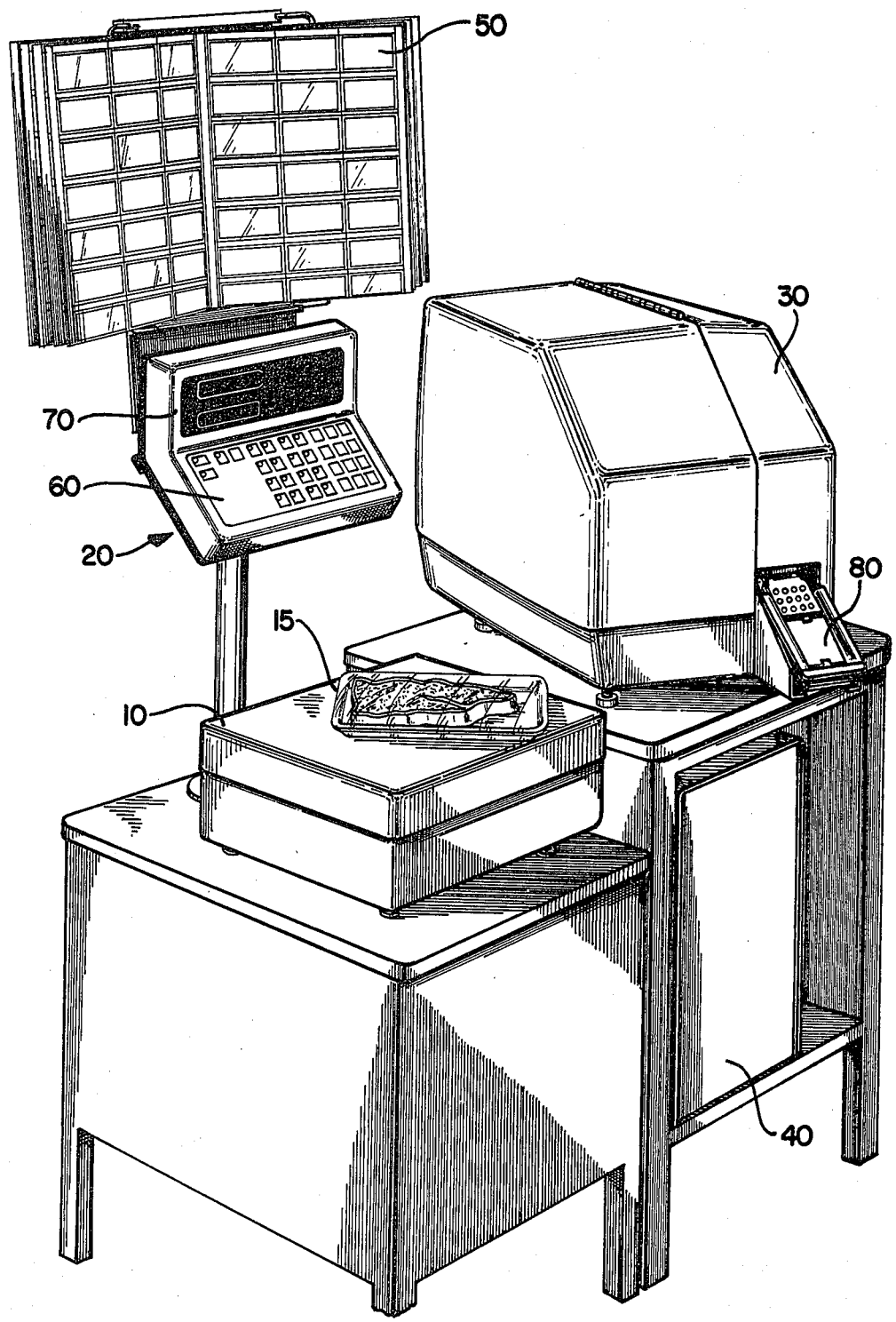
FIG. 1 is a perspective view showing a weighing and label printing system including a label catalog, a keyboard and display unit, a scale, printer, and controller.

Referring now to the drawings which illustrate a preferred embodiment of the invention, and particularly to FIG. 1, a weighing and label printing system constructed according to this invention includes a scale 10 on which a packaged commodity 15 may be placed for weighing, a keyboard and display unit 20, a printing mechanism 30, and a controller 40. A catalog 50 is provided with representative labels containing information about each of the commodities which are stored in the memory of the controller 40. The operator may refer to this catalog and enter the proper code on the keyboard 60. A visual display 70 shows, among other things, the unit price and the name of the commodity selected. Thereafter, when a package 15 is placed on the scale 10, the weight of the package along with the total price of the package is displayed, and a label 80 is generated an dispensed from the printer 30 for application to the package 15.

Figure 2:
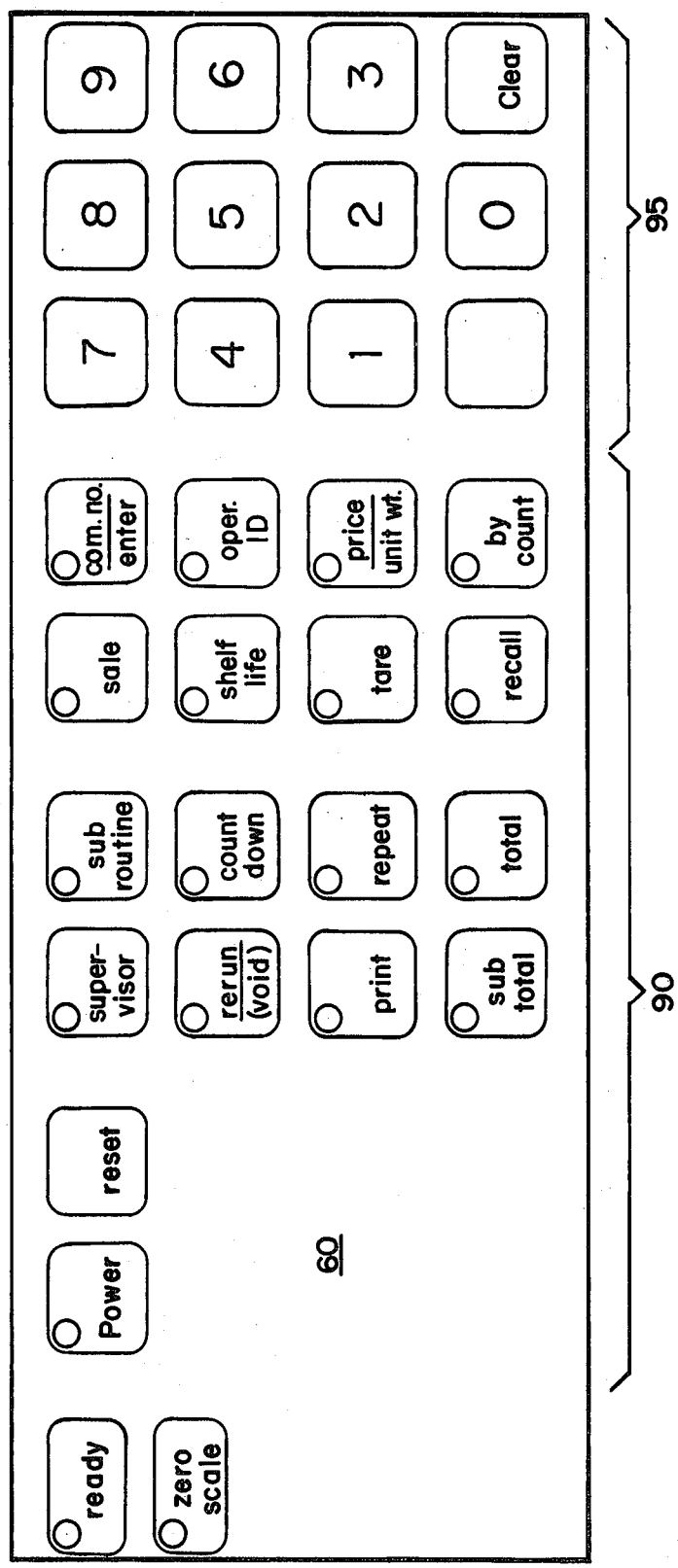
FIG. 2 is a plan view of the operator's keyboard on which instructions and information may be entered into the system.

The operator's keyboard, as shown in FIG. 2, includes eighteen function keys 90 and a ten-key numeric (with "clear") keyboard 95. Each of the function keys, except "RESET" is provided with a LED indicator in the upper left corner to indicate which keys are functioning at any given time. For example, when the "POWER" key is initially depressed, the only function key with an illuminated LED is the "SUB ROUTINE" key. When the system is operating, depressing the "RECALL" key will cause the LED's to illuminate on the "COM.NO./ENTER" key, "SHELF LIFE" key, "TARE" key, and the "PRICE/UNIT WT." key.

A portion of the catalog 50 is shown in FIG. 3. This catalog allows the operator a convenient means of referring to the information which is stored electronically within a memory in the controller 40. Each of the labels in the catalog show the UPC/EAN or commodity code at position 110, the tare weight at position 115, a velocity code at position 120, and a commodity description at position 125. The commodity description may be two lines long. By referencing this catalog, the operator may see quickly the commodity description and its associated velocity and UPC/EAN commodity code and use that information to select the commodity from the keyboard 60.

Referring now to the simplified block diagram of FIG. 5, it is seen that the scale 10, the keyboard device 20 and the printer 30 are all connected to the controller 40. The controller 40 includes a microprocessor 140; a clock/calendar circuit 145; a power supply with battery backup 150; a weight register 160; a total value register 165; a memory circuit 170, including a data file 172, a description file 174 and a directory 176; and a totals file 180.

The data file 172 contains sufficient memory space for 500 different commodities, each commodity being stored therein includes the following items:

TABLE I

| DATA FILE | |
|---|---|
| ITEM | BYTES |
| PLU HEADER | 2 |
| UPC/EAN (COMMODITY) | 6 |
| VELOCITY NUMBER | 3 |
| PRICE PER UNIT | 5 |
| BY-COUNT QUANTITY | 2 |
| BY-COUNT PACKAGE ID/GRADE | 1 |
| SHELF LIFE | 3 |
| TARE | 4 |
| ACTION NO | 3 |
| SEPARATOR | 1 |
| SUM | 30 |

The description file 174 contains the alphabetical descriptions for each of the items contained in file 172, and each file contains the following items:

TABLE II

DESCRIPTION FILE

| ITEM | BYTES |
|---|---|
| UPC/EAN (COMMODITY) | 6 |
| ALPHA COMMODITY DESCRIPTION AND DISPLAY | 64 max |
| SUM | 70 max |

The directory file 176 is used by the microprocessor 140 to associate the data and description files 172 and 174.

The totals file 180 contains the following items.

TABLE III

TOTALS FILE

| ITEM | BYTES |
|---|---|
| JOURNAL HEADER (XYZ) | 3 |
| COMMODITY NUMBER | 6 |
| SUM OF ITEMS WEIGHTS | 6 |
| SUM OF ITEMS VALUES | 6 |
| TOTAL NUMBER OF PACKAGES | 4 |
| PRICE UNIT | 5 |
| TARE | 4 |
| PULL DATE | 4 |
| SCALE NO | 2 |
| OPERATOR NO | 4 |
| SEPARATOR | 1 |
| SUM | 45 |

The printer 30 includes a microprocessor 190, a fixed information buffer 200 including a commodity register 210, a unit price register 220, a tare register 230 and a date register 240. The printer also is provided with a variable information buffer 250 which includes a weight register 260 and a value register 270.

Figure 6A:
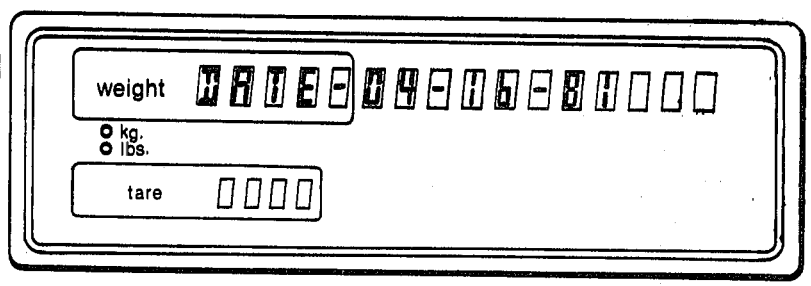
FIGS. 6a–6e illustrate the display sequence upon power turn-on initialization of the system.
Figure 6B:
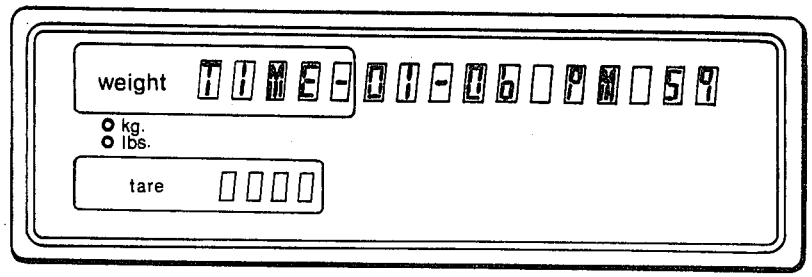
Figure 6C:
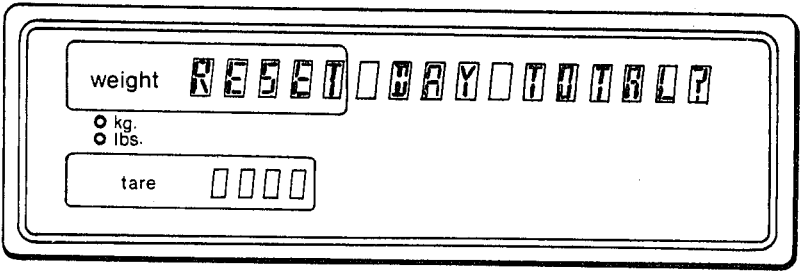
Figure 6D:
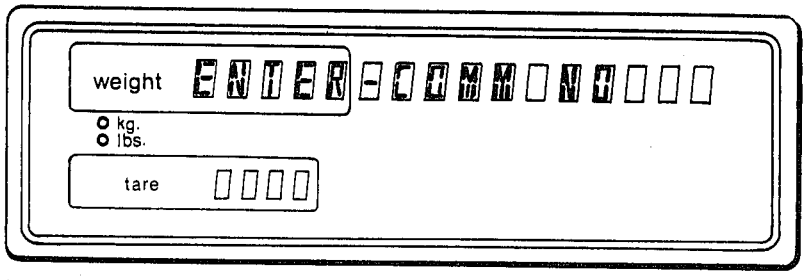
Figure 6E:
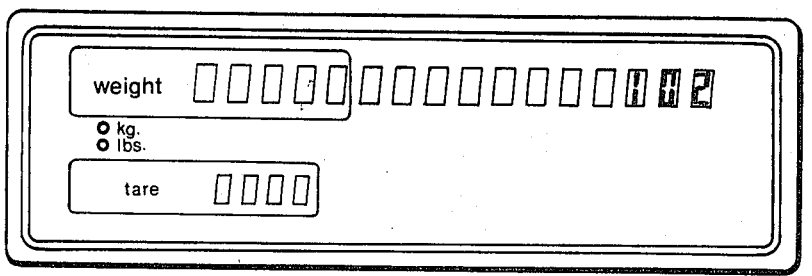
Figure 7A:
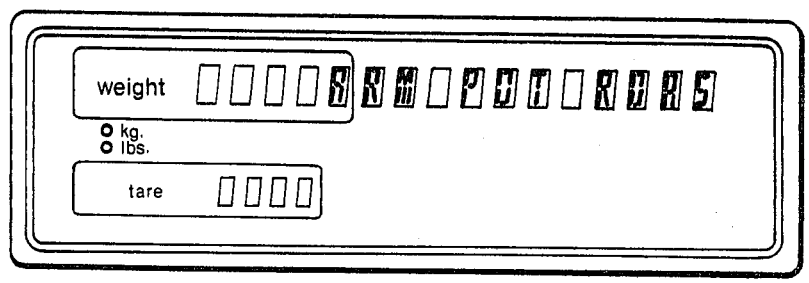
FIGS. 7a–7d illustrate a rotating display of a commodity name.
Figure 7B:
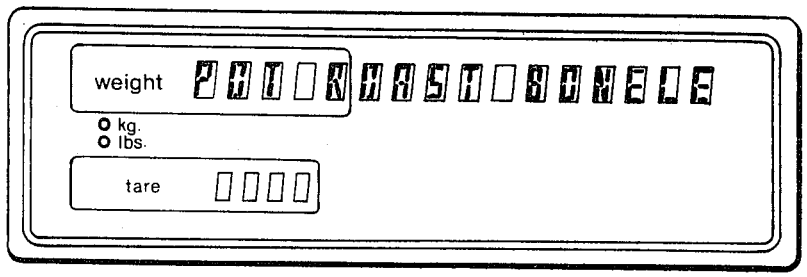
Figure 7C:
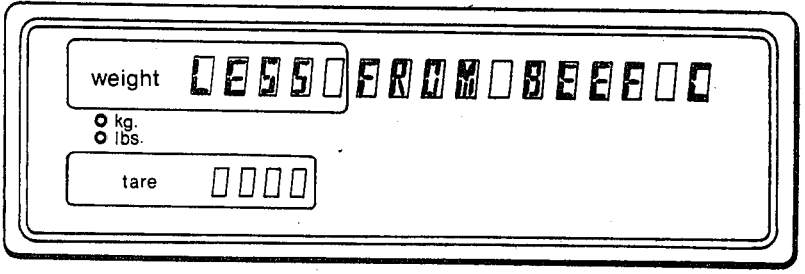
Figure 7D:
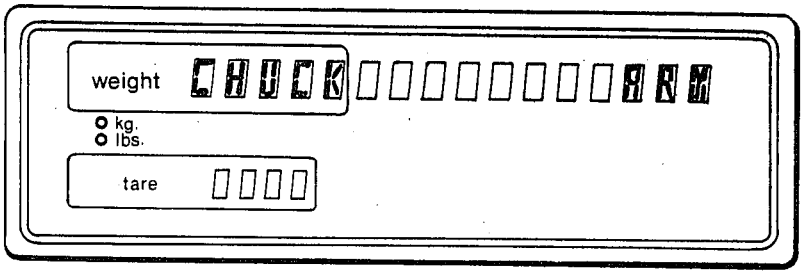

When the "POWER" switch is depressed, the sixteen digit upper portion of the display 70 will provide the date found in the clock/calendar 145, as shown in FIG. 6a. That calendar is kept updated by the backup portion of the power supply 150 even though the scale might be disconnected from the commercial power source. At this time, the only function key that may be operated is the "SUB ROUTINE" key, and when that key is depressed, the display 70 will indicate the time of day, as shown in FIG. 6b. Pressing the "SUB ROUTINE" key again will cause the display to read "RESET DAY TOTAL?" as shown in FIG. 6c. Pressing the "SUB ROUTINE" key a third time will cause the display 70 to read "ENTER-COMM NO" at which time the operator, by reference to the catalog 50, or by recalling from memory the commodity, enters either the velocity number associated with a particular commodity or the UPC/EAN code for that commodity. The velocity code is merely a three digit shorthand means for accessing the information stored in the memory 170. Alternatively, entering the standard UPC/EAN code, a six digit number, will access that same information. In this example, a velocity code "102" is entered, and that will appear as shown in FIG. 6e.

Referring back to FIG. 3, it will be noted that the item which has velocity code 102 is "ARM POT ROAST BONELESS FROM BEEF CHUCK." This commodity has a UPC/EAN code number 00050,and a tare weight for the package of 0.02 lb. Not shown on the catalog, but nevertheless contained in the memory 170, is the unit cost of $1.99.

Figure 8:
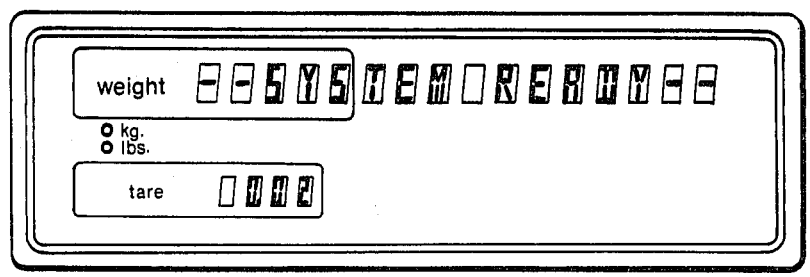
FIG. 8 illustrates the display following initialization of the system.

Once the velocity code has been entered through the numeric keys 95 on the keyboard, the operator the presses the COM.NO./ENTER key, and this results in a rotating display as shown in FIG. 7a-7d. A rotating display is used in the preferred embodiment since the name of the commodity is greater than the sixteen digit alphanumeric display devices provided in the display 70. When the operator depresses the COM.NO.-/ENTER key once again, the display will read "—SYSTEM READY—," as shown in FIG. 8.

At this time, the fixed information stored in the memory 170 is transferred to the fixed information buffer 200 and the printer 30. That fixed information includes the commodity name stored in register 210, the unit price stored in register 220, the tare weight stored in register 230 and the date information stored in register 240. The date is calculated by taking the current date from the clock/calendar 145 and the shelf life information stored in the data file 172 and calculating the expiration date.

Figure 9:
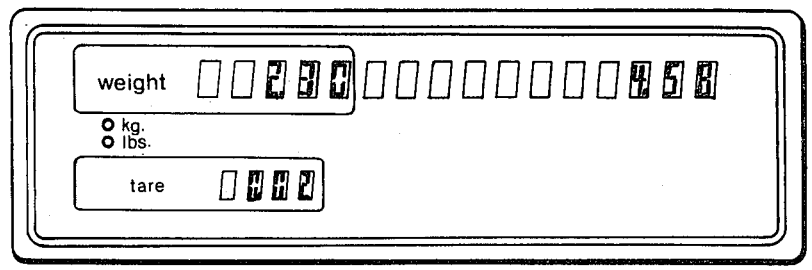
FIG. 9 illustrates the display when a packaged commodity is placed on the scale.

A packaged commodity 15 is then placed on the scale 10 to be weighed. For purposes of explanation, it is assumed that the package weighs 2.3 pounds. That weight will be displayed at the left hand side of the display, as shown in FIG. 9, the total value of the packaged commodity ($4.58) will be shown at the right hand side of the display. This information is obtained from the weight register 160 and the total value register 165. Although not displayed at this time, the weight and total value information are stored in the totals file 180. The totals file will accummulate this and other information as listed in Table III.

The weight information and total value information are transferred from the controller 40 to the variable information buffer 250 in the printer 30, and a label 80 may now be printed. As shown in FIG. 4, the label contains the net weight at position 300, the unit cost at position 310, total price or value at position 320, the commodity description at position 330, the present date at position 340, the expiration date at position 350, and a UPC/EAN commodity number along with the total price and associated bar code at position 360. This label is dispensed from the printer 30 printed side down. Adhesive on the upper side of the label allows it to be attached directly to the packaged commodity 15.

At any time, the operator may obtain a human-readable verification of the commodity name, as well as the velocity code and the UPC/EAN commodity number without printing a label and without affecting the information sent to the totals file 180. The operator may also recall other information stored in the date file 172, such as price per unit weight, tare weight, or shelf life information.

Figure 10A:
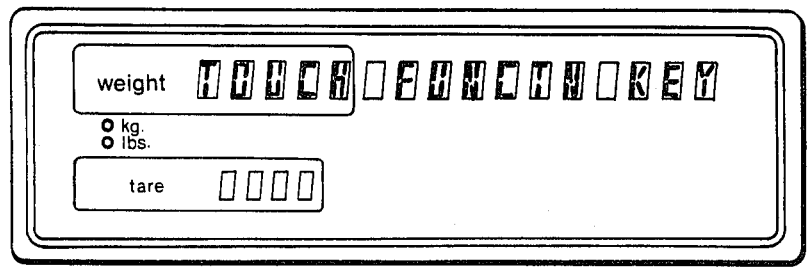
FIGS. 10a–10c illustrate the display sequence when recalling commodity information.
Figure 10B:
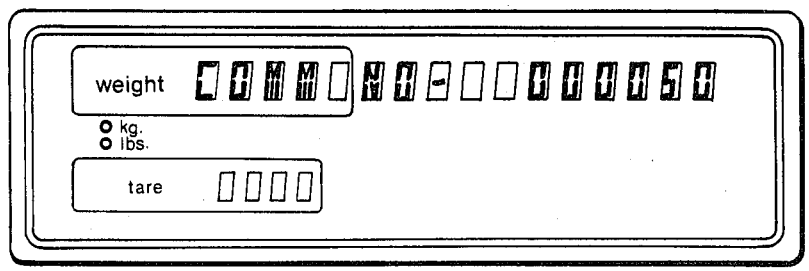
Figure 10C:
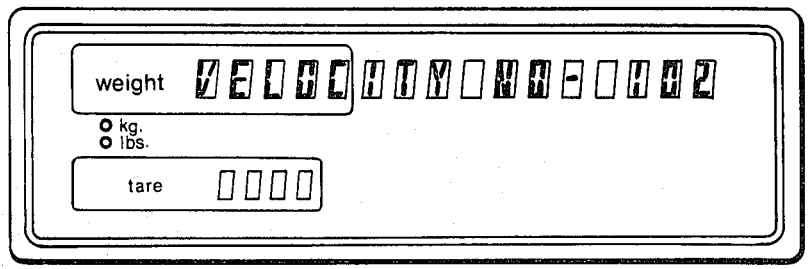
Figure 11:
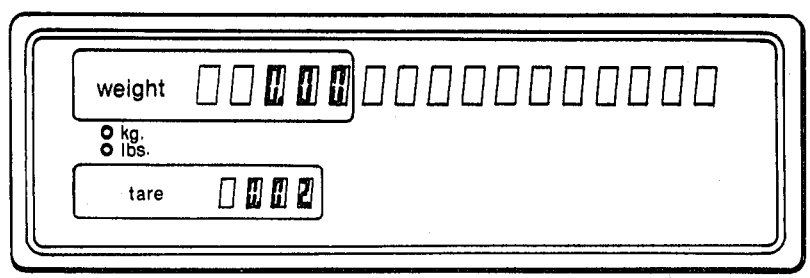
FIG. 11 illustrates the display with no package on the scale and the weighing system in the weighing and label printing mode.

This is done by pressing the "RECALL" key which results in the display showing the words "TOUCH FUNCTN KEY" as illustrated in FIG. 10a. When the operator touches the COM.NO./ENTER key, the first item to be display is the UPC/EAN commodity number, as illustrated in FIG. 10b. Pressing the COM.NO.-/ENTER key a second time will cause the velocity code to be displayed, as shown in FIG. 10c; and pressing the COM.NO./ENTER key a third time will cause the commodity name to be displayed, again in a rotating manner, as previously illustrated in FIGS. 7a-7d. Pressing the COM.NO./ENTER key a fourth time returns the system to the ready condition, and the display will equal zero (FIG. 11) if there is no commodity on the scale, or it will indicate the weight and the price of a commodity placed on the scale (FIG. 9).

Figure 12A:
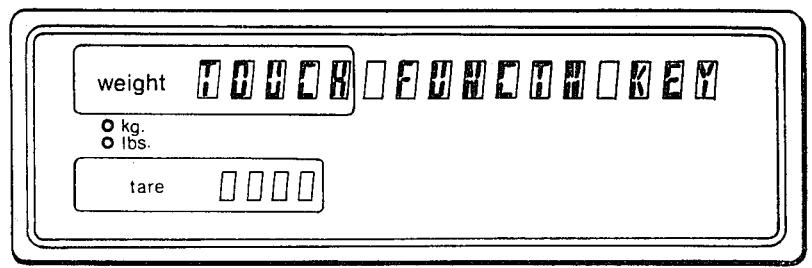
FIGS. 12a–12c illustrate the display sequence when recalling price/weight information.
Figure 12B:
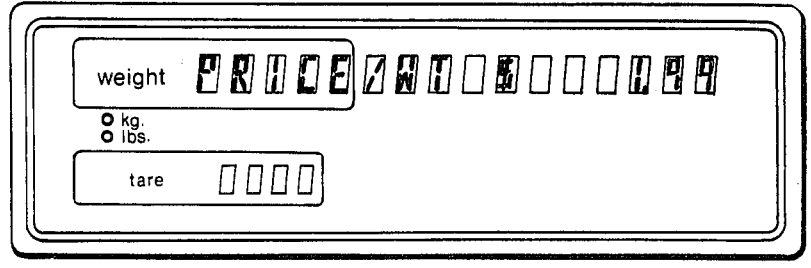
Figure 12C:
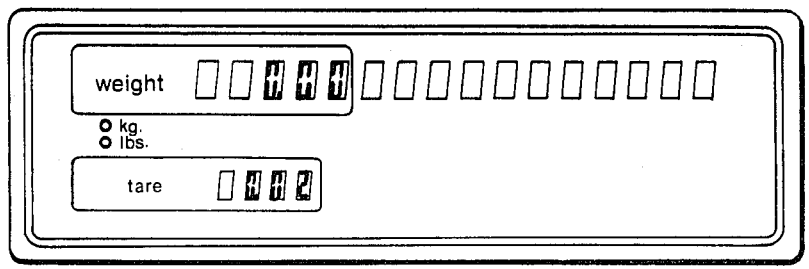

The operator may recall other information by pressing the "RECALL" button which causes the display to read "TOUCH FUNCTN KEY" (FIG. 12a) and if the PRICE/UNIT WT. button is then pressed, the display will read "PRICE/WT $1.99" (FIG. 12b) which is the unit cost stored in the data file 172 for the commodity which has been previously selected. Pressing the PRICE/UNIT WT. button again returns the system to its ready condition (FIG. 12c).

All of the above functions are summarized in Table IV:

TABLE IV

| | KEY OPERATION | DISPLAY |
|---|---|---|
| 1. | POWER | DATE-04-16-81 |
| 2. | SUB ROUTINE | TIME-01-06 PM 59 |
| 3. | SUB ROUTINE | RESET DAY TOTAL? |
| 4. | SUB ROUTINE | ENTER-COMM NO |
| 5. | [Keyboard "102"] | 102 |
| 6. | COM.NO./ENTER | ARM POT ROAS |
| 6a. | | POT ROAST BONELE |
| 6b. | | LESS FROM BEEF C |
| 6c. | | CHUCK     ARM |
| 7. | COM.NO./ENTER | -SYSTEM READY- |
| 8. | [Place product on scale] | 2.30     4.58 |
| 9. | [Remove product] | 0.00 |
| 10. | RECALL | TOUCH FUNCTN KEY |
| 11. | COM.NO./ENTER | COMM NO- 000050 |
| 12. | COM.NO./ENTER | VELOCITY NO- 102 |
| 13. | COM.NO./ENTER | ARM POT ROAS |
| 13a. | | POT ROAST BONELE |
| 13b. | | LESS FROM BEEF C |
| 13c. | | CHUCK     ARM |
| 14. | COM/NO./ENTER | 0.00 |
| 15. | [Place product on scale] | 2.30     4.58 |
| 16. | RECALL | TOUCH FUNCTN KEY |
| 17. | PRICE/UNIT WT. | PRICE/WT $ 1.99 |
| 18. | PRICE/UNIT WT. | 0.00 |
| 19. | [Place product on scale] | 2.30     4.58 |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A combined weighing scale and label printer for weighing a packaged commodity, printing an adhesive label with information regarding the weight, unit price and total value of the commodity and delivering the printed label printed side down for application to the package including a keyboard for entering a code corresponding to the name of the packaged commodity; visual display means responsive to a keyboard entry for displaying a human-readable verification of the commodity name prior to printing a first label for said commodity; and means for computing the total value of the packaged and weighed commodity, and in response thereto, printing such total value along with the weight, unit price and commodity name on a label for application to said package.

2. A combined weighing scale and label printer for weighing a packaged commodity, printing a label with information regarding the commodity, weight, unit price and total value of the commodity and delivering the printed label printed side down either for manual application to the package or directly to an automatic label applier for application to the package without operator intervention, a keyboard for entering a code corresponding to the name of the packaged commodity, visual display means responsive to a keyboard entry of a commodity code for displaying a human-readable verification of the commodity name prior to printing a first label for said commodity, and means for computing the total value of the packaged and weighed commodity, and in response thereto, printing such total value along with the weight, unit price and commodity name on a label for application to said package.

3. In a combined weighing scale and label printer for weighing a packaged commodity including means for printing a label with information regarding the commodity, weight, unit price and total value of the commodity and delivering the printed label printed side down either for manual application to the package or directly to an automatic label applier for application to the package without operator intervention, means for computing the total value of the packaged and weighing commodity, and in response thereto, printing such total value along with the weight, unit price and commodity name on a label for application to said package, the improvement comprising a keyboard for entering a code corresponding to the name of the packaged commodity, and visual display means responsive to a keyboard entry of a commodity code for displaying a human-readable verification of the commodity name prior to printing a first label for said commodity.

4. A combined weighing scale and label printer for weighing a packaged commodity including, means for printing a label with information regarding the commodity, weight, unit price and total value of the commodity and delivering the printed label printed side down either for manual application to the package or directly to an automatic label applier for application to the package without operator intervention, memory means containing information regarding the unit price of a commodity, the tare weight of the package and the commodity name for a plurality of different commodities to be weighed and labeled, a keyboard for accessing said memory means by reference to a code identifying the commodity, visual display means responsive to a keyboard entry for displaying at any time desired by the operator a human-readable verification of the last selected commodity name, and means for computing the total value of the packaged and weighed commodity, and in response thereto, printing such total value along with the weight, unit price and commodity name on a label for application to said package.

5. A combined weighing scale and label printer for weighing a packaged commodity including, means for printing a label with information regarding the commodity, weight, unit price and total value of the commodity and delivering the printed label printed side down either for manual application to the package or directly to an automatic label applier for application to the package without operator intervention, memory means containing information regarding the commodity name and other relevant information for a plurality of different commodities to be weighed and labeled.

a keyboard for permitting the operator to interrogate said memory means, visual display means responsive to a keyboard entry for displaying a human-readable verification of a commodity name previously selected, and means for computing the total value of the packaged and weighed commodity, and in response thereto, printing such total value along with the weight, unit price and commodity name on a label for application to said package.

6. A combined weighing scale and label printer for weighing a packaged commodity including, means for printing a label with information regarding the commodity, weight, unit price and total value of the commodity and delivering the printed label printed side down either for manual application to the package or directly to an automatic label applier for application to the package without operator intervention, memory means containing information regarding the commodity name and other relevant information for a plurality of different commodities to be weighed and labeled, a keyboard for permitting the operator to interrogate said memory means, visual display means responsive to a keyboard entry for displaying a human-readable verification of a commodity name previously selected, means for computing the total value of the packaged and weighed commodity, and in response thereto, printing such total value along with the weight, unit price and commodity name on a label for application to said package, and a totals file for storing, with respect to each separate commodity, the number of items weighed, total weight and total value.

7. The combined weighing scale and label printer of any of claims 1-6 wherein said visual display means comprises a series of individual alphanumeric display elements associated in elongated horizontal arrangement, wherein selected information relating to the weight, unit price or total value are displayed on selected ones of said elements during a weighing operation, and wherein said same elements are also utilized to display the human-readable commodity information when called for by the operation.

8. The combined weighing scale and label printer of claim 7 wherein display of the commodity name utilizes all of said individual elements in rotating fashion from right to left in said elongated arrangement.

9. A combined weighing scale and label printer for weighing a packaged commodity, printing an adhesive label with information regarding the weight, unit price and total value of the commodity and presenting the printed label with its printed side out of view of an operator for application to the package including a keyboard for entering a code corresponding to the name of the packaged commodity; visual display means responsive to a keyboard entry for displaying a human-readable verification of the commodity name prior to printing a first label for said commodity; and means for computing the total value of the packaged and weighed commodity, and in response thereto, printing such total value along with the weight, unit price and commodity name on a label for application to said package.

* * * * *